United States Patent Office 2,895,971
Patented July 21, 1959

2,895,971

REMOVAL OF IMPURITIES FROM IRRADIATED 7-DEHYDROCHOLESTEROL

Israel Spiegel, Verona, N.J., and Oscar Schneider, deceased, late of Fords, N.J., by Rachelle Schneider, legal representative, Fords, N.J., assignors to Nopco Chemical Company, Harrison, N.J., a corporation of New Jersey No Drawing. Application November 29, 1957
Serial No. 699,450

10 Claims. (Cl. 260—397.25)

This invention relates to the production of vitamin $D_3$ and more particularly to a process for purifying irradiated 7-dehydrocholesterol.

The discovery by Ziegler (Annalen 551, 80–119) that the halogenation of organic compounds at a carbon atom alpha to a double bond could be accomplished by using compounds such as N-halogenated acid amides and imides as halogenating agents led to the development of a procedure for making vitamin $D_3$ by halogenation of cholesteryl esters by the Ziegler process followed by dehydrohalogenation and saponification to give 7-dehydrocholesterol which is then subjected to irradiation by ultra-violet light to give vitamin $D_3$.

It has been found that during the above process for the production of vitamin $D_3$ various contaminants or by-products of the reaction become associated with the vitamin $D_3$, and if in the further processing or use of the vitamin $D_3$ any heating steps are involved, the contaminants or by-products tend to catalyze or bring about the destruction of the vitamin $D_3$ and convert it to biologically inactive material. Just what these contaminants or by-products are has as yet not been definitely determined. Since it is necessary following the irradiation process to employ heat in further processing of the vitamin $D_3$, there is a great need for a means of separating from the vitamin $D_3$, and any unirradiated 7-dehydrocholesterol associated therewith, the contaminants and by-products of the process of producing 7-dehydrocholesterol. Following the irradiation procedure it is common practice to remove from the irradiated material the solvent (usually ether) in which the 7-dehydrocholesterol was dissolved during the carrying out of the irradiation process. Then the irradiated material is usually dissolved in a solvent such as methanol or ethanol and cooled to a relatively low temperature and filtered. Vitamin $D_3$ will remain dissolved in the cooled alcoholic solvent whereas the unconverted 7-dehydrocholesterol will crystallize at the low temperature and will be separated from the solution by the filtration procedure. Thereafter the alcoholic solvent is usually removed from the vitamin $D_3$ by vacuum distillation. Although in some cases heating of the alcoholic solution of the vitamin $D_3$ to remove the solvent does not cause destruction of any vitamin $D_3$ by the contaminants and by-products of the preceding reactions which are associated therewith, more frequently some destruction will occur. This destruction of the vitamin $D_3$ is readily shown by spectrographic analysis since when such destruction occurs absorption peaks will occur on the absorption curve at 2750–2800 A., 2850–2900 A., and 3000 A. These peaks do not appear on the typical absorption curve for vitamin $D_3$.

It is the object of this invention to provide improvements in the procedure for the production of vitamin $D_3$.

A more specific object of the invention is to provide a procedure for treating irradiated 7-dehydrocholesterol to remove therefrom any contaminants and by-products which may have become associated therewith during the process of producing 7-dehydrocholesterol.

Other objects of the invention will in part be obvious and will in part appear hereinafter.

We have discovered that the above and other objects of the invention can be accomplished by contacting the alcoholic solution of irradiated 7-dehydrocholesterol with a cation exchange resin and with an anion exchange resin prior to or subsequent to crystallizing out of the solution the sterol that has not been converted to vitamin $D_3$ by the irradiation procedure. The cation exchange resin which is used should be in the hydrogen form and the anion exchange resin should be in its basic form. Preferably, strongly acidic and strongly basic exchange resins are used; however, any combination of cation and anion exchange resins may be used provided they are in the hydrogen form and basic form, respectively. Preferably the alcohol solution is contacted with the resins by passing the solution through an intimate mixture of the resins. If desired, however, the solution may be passed through first one resin and then through the other resin and it does not matter which resin is used first. Also, although it is preferred to pass the solution through a column or bed of the resins, any other suitable means of contacting the solution with the resins can be employed.

Illustrative examples of commercially available strongly acidic cation exchange resins in the hydrogen form are "Amberlite IR-120," "Zeo Karb 225," "Duolite C-20," "Dowex 50" and "Nalcite HCR" produced by Rohm & Haas, The Permutit Company, Chemical Process Company, Dow Chemical Company, and National Aluminate Company, respectively. Examples of commercially available strongly basic anion exchange resins in the basic form are "Amberlite IRA-400" and "Amberlite 410," "De-Acidite FF," "Duolite A-41," "Dowex 1" and "Dowex 2" and "Nalcite SAR" produced by Rohm & Haas, Permutit, Chemical Process, Dow, and National Aluminate, respectively. Weakly acidic cation exchange resins that are commercially available and suitable for use in our process are "Amberlite IRC-50" of Rohm & Haas and "Zeo Karb 226" of Permutit. Commercially available weakly basic anion exchange resins that can be used in our process are "Amberlite IR-4b" and "Amberlite IR-45," "De-Acidite E," "Duolite A-2" and "Nalcite WBR" produced by Rohm & Haas, Permutit, Chemical Process, and National Aluminate, respectively.

In some cases the above cation exchange resins are not supplied in the hydrogen form nor are the anion exchange resins supplied in the basic form. In those cases, of course, one can readily convert the form which is supplied to the hydrogen form in the case of cation exchange resins by treatment with acid and to the basic form in the case of anion exchange resins by treatment with sodium hydroxide.

The cation exchange resin and the anion exchange resin preferably should be used in relatively equivalent quantities. A very excellent and in fact the preferred way of using the resins is to use a bed of mixed resins such as the commercially available resin mixture "Amberlite MB–1" of Rohm & Haas which is a mixture of "Amberlite IR–120" and "Amberlite IRA–400" in the hydrogen and basic forms, respectively. However, any mixture of cation and anion exchange resins may be employed as long as it meets the requirements set forth above. Thus both the sulfonated type of cation exchange resins and the carboxylic type of cation exchange resins are quite suitable. With the anion exchange resins both quaternary ammonium type resins and the polyamine type resins are quite suitable.

After the solvent solution of the 7-dehydrocholesterol has been passed through the zone of ultra-violet light and the irradiation process is completed, the ether or other solvent in which the 7-dehydrocholesterol was dissolved during the irradiation process is removed by vacuum distillation. The irradiated material is then dissolved in methyl or ethyl alcohol, preferably in methyl alcohol, at a concentration of from about 3% to about 15%. Although the sterol material which was not converted to vitamin $D_3$ can, if desired, be removed from the alcoholic solution prior to passing the alcoholic solution through the ion exchange resins, it is preferable to pass the alcoholic solution through the resins before removing the unconverted sterol so as to separate from the unconverted sterol any by-products or contaminants that may be present therewith. The temperature at which the alcoholic solution is passed through the ion exchange resins is not critical and therefore the alcoholic solution may be passed through the ion exchange resins immediately after the irradiated sterol material has been dissolved in the alcohol. Such dissolving is usually carried out at a temperature slightly above room temperature in order to get a thorough solution of the irradiated sterol material in the alcohol. The amount of ion exchange resins employed and the rate of flow through the ion exchange resins of the alcoholic solution must of course be adjusted so as to remove the contaminants and by-products associated with the irradiated sterol. However, the amounts of ion exchange resins and the rate of flow are not particularly critical and in most cases as a matter of practical operations a column of sufficient size is employed so that a sufficient amount of the ion exchange resins will be present to make it unnecessary to regenerate or replace the ion exchange resins at too frequent intervals and so as to permit flow of the alcoholic solution through the ion exchange resins with a reasonable rate of speed. In all cases one can readily determine whether or not a sufficient amount of the ion exchange resins is being employed and whether the rate of flow of the alcoholic solution is such as to permit efficient removal of the contaminants and by-products merely by taking a sample of the irradiated sterol material which has passed through the ion exchange resins and testing it for vitamin $D_3$ content by spectrographic means both before and after heating the sterol material to a temperature of about 90° C. If a sufficient amount of the ion exchange resins has been employed and if the rate of flow has been properly adjusted so as to remove all the contaminants and by-products, the spectrographic curve for the heated irradiated sterol material will be identical with the curve for the unheated irradiated sterol material. If sufficient ion exchange resin has not been employed or if the rate of flow has been too great, then the spectrographic curve for the heated irradiated sterol material will show destruction of vitamin $D_3$ as compared to the spectrographic curve for the unheated irradiated sterol material. As a general rule an ion exchange resin column containing from about 10 to 15 lbs. of mixed cation and anion exchange resins will be sufficient to process about 25 liters of alcoholic solution of irradiated 7-dehydrocholesterol per hour. Furthermore, since the amount of contaminants and by-products in the alcoholic solution is small, such an amount of ion exchange resins will process alcoholic solutions of the irradiated 7-dehydrocholesterol for quite a long period of time without the necessity of regeneration or replacement of the ion exchange resins. Since it is a general practice to analyze spectrophotometrically the vitamin $D_3$ which is recovered from the alcoholic solution and since that recovery from the alcoholic solution involves the use of sufficient heat to have a destructive effect on the vitamin $D_3$ if contaminants or by-products are present, one has a ready check on the condition of the ion exchange resins and can tell immediately when the ion exchange resins are in need of regeneration or replacement.

Just what the various contaminants and by-products are that are removed by the ion exchange resins has not been determined but apparently they are made up of a number of different things such as minute quantities of metallic salts which may have been picked up by the sterol in its passage through the various processing equipment, by-products of the bromination action, and materials that may have been formed during the ultra-violet ray irradiation process, such materials having been formed perhaps by action of the ultraviolet rays on the metal compounds, the by-products of the bromination reaction or sterol by-products that may have carried along with the desired 7-dehydrocholesterol. However, regardless of what is the source or nature of the contaminants and by-products, we have found that passage of the alcohol solution of the irradiated 7-dehydrocholesterol through the mixed cation and anion exchange resins in accordance with our procedure effectively removes those contaminants and by-products which have a destructive effect on vitamin $D_3$ when vitamin $D_3$ is heated therewith.

For a fuller understanding of the nature and objects of the invention reference should be had to the following example which is given merely as a further illustration of the invention and is not to be construed in a limiting sense:

Example

The ether was removed from an ether solution of irradiated 7-dehydrocholesterol by vacuum distillation, and the 7-dehydrocholesterol was then dissolved in methanol. A small amount of the methanol solution was then heated to remove the methanol from the irradiated sterol and then the irradiated sterol was heated on a steam bath for ten minutes. The irradiated 7-dehydrocholesterol which had been thus heated was then analyzed spectrophotometrically. Instead of having the characteristic vitamin $D_3$ curve, the heated irradiated 7-dehydrocholesterol had an absorption curve having considerable absorption at 2750–2800 A., 2850–2900 A. and at 3000 A. thus showing destruction of vitamin $D_3$.

The rest of the methanol solution of the irradiated 7-dehydrocholesterol was passed by gravity through an ion exchange column containing Amberlite MB–1 Monobed ion exchange resin. A portion of this methanol solution was then heated to remove the methanol from the irradiated sterol and then the irradiated sterol was heated on a steam bath for ten minutes. The irradiated sterol which had been thus heated was then analyzed spectrophotometrically. The absorption curve for this material, which had been subjected to heating, was the typical absorption curve for vitamin $D_3$ thus showing that passage of the methanol solution of the irradiated 7-dehydrocholesterol through the ion exchange resin had removed all contaminants and by-products which would bring about destruction of vitamin $D_3$ when heated therewith.

Having described our invention, what we claim is new and desire to secure by Letters Patent is:

1. A process for removing impurities from irradiated 7-dehydrocholesterol which comprises contacting an alcoholic solution of irradiated 7-dehydrocholesterol with a cation exchange resin and with an anion exchange resin, the cation exchange resin being in the hydrogen form and the anion exchange resin being in the basic form.

2. The process of claim 1 wherein the cation exchange resin is a strongly acidic resin and the anion exchange resin is a strongly basic resin.

3. The process of claim 1 wherein the alcoholic solution is a methanolic solution.

4. The process of claim 2 wherein the alcoholic solution is a methanolic solution.

5. The process of claim 1 wherein the cation exchange resin and the anion exchange resin are used in approximately equivalent amounts.

6. The process of claim 2 wherein the cation exchange resin and the anion exchange resin are used in approximately equivalent amounts.

7. The process of claim 1 wherein the alcoholic solution is passed through an intimate mixture of the cation exchange resin and the anion exchange resin.

8. The process of claim 2 wherein the alcoholic solution is passed through an intimate mixture of the cation exchange resin and the anion exchange resin.

9. The process of claim 6 wherein the alcoholic solution is passed through an intimate mixture of the cation exchange resin and the anion exchange resin.

10. The process of claim 4 wherein the methanolic solution is passed through an intimate mixture of approximately equivalent amounts of a cation exchange resin and an anion exchange resin.

References Cited in the file of this patent

UNITED STATES PATENTS

| | | |
|---|---|---|
| 2,707,710 | Velluz et al. | May 3, 1955 |
| 2,776,304 | Klein et al. | Jan. 1, 1957 |

OTHER REFERENCES

Rohm & Haas: "Amberlite Monobed Deionization," (June 1950), page 11.